(No Model.) 2 Sheets—Sheet 1.
J. O. POOLE.
DRAWING BOARD.
No. 564,840. Patented July 28, 1896.
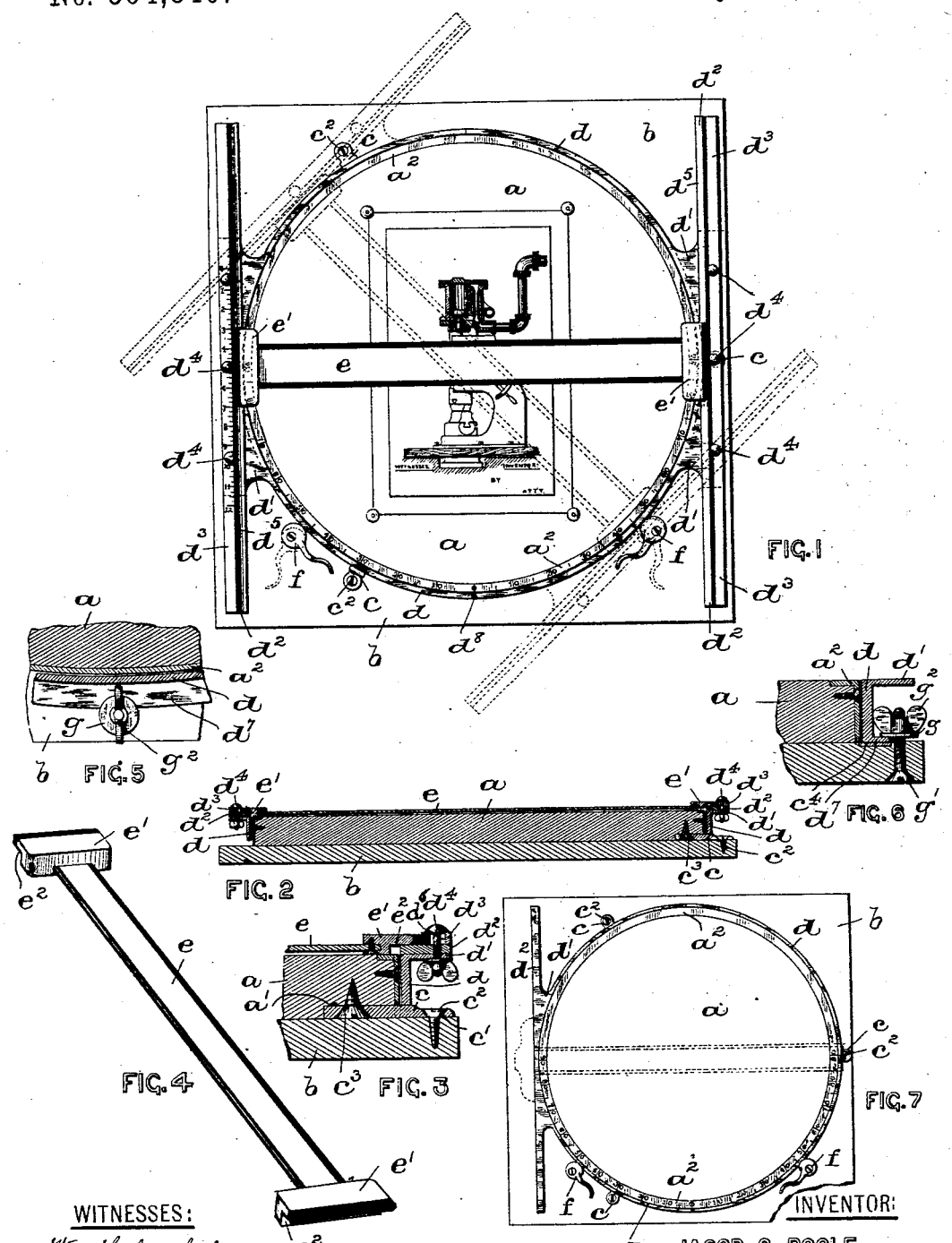
WITNESSES:
Wm. H. Camfield Jr.
B Mortimer Throdell
INVENTOR:
JACOB O. POOLE.
BY
Fred'k C. Fraentzel,
ATTORNEY
THE NORRIS PETERS CO., PHOTO-LITHO., WASHINGTON, D. C.

(No Model.)  J. O. POOLE.  2 Sheets—Sheet 2.
DRAWING BOARD.
No. 564,840.  Patented July 28, 1896.
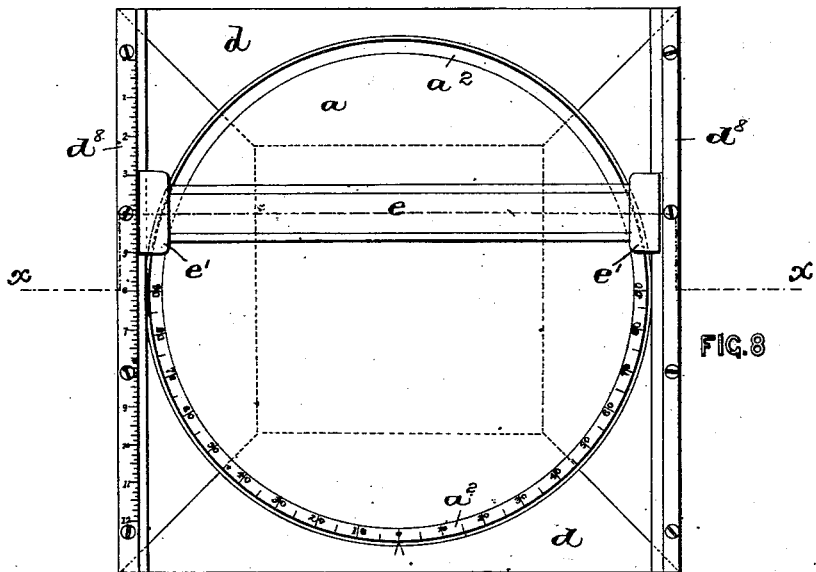
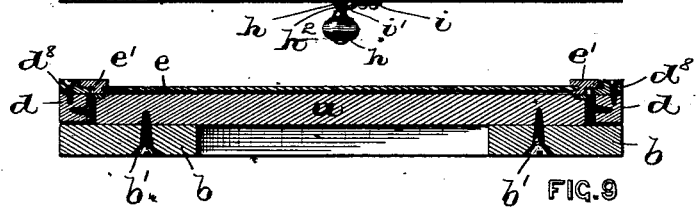
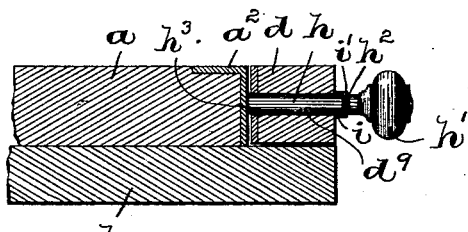
WITNESSES:  INVENTOR:
Wm. H. Canfield, Jr.  JACOB O. POOLE.
B. Mortimer Trudell.
BY Fred C. Fraentzel
ATTORNEY

UNITED STATES PATENT OFFICE.

JACOB O. POOLE, OF NEWARK, NEW JERSEY, ASSIGNOR OF ONE-HALF TO EDMUND P. BACKUS, OF EAST ORANGE, NEW JERSEY.

DRAWING-BOARD.

SPECIFICATION forming part of Letters Patent No. 564,840, dated July 28, 1896.

Application filed October 30, 1895. Serial No. 567,402. (No model.)

*To all whom it may concern:*

Be it known that I, JACOB O. POOLE, a citizen of the United States, residing at Newark, in the county of Essex and State of New Jersey, have invented certain new and useful Improvements in Attachments for Drawing-Boards; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention is in the nature of an improvement in draftsmen's boards, and has for one of its objects to provide a device or instrument which is to be used in connection with drawing-boards, by means of which parallel and angularly-arranged lines can be drawn with the use of a sliding rule or linead, and which may also be made to rotate in the manner to be hereinafter fully specified to take the place of the ordinary T-square, and avoiding the use of a triangle in connection with the rule or square, as heretofore.

To avoid the annoyance caused by the necessary handling of two instruments or devices, namely, the T-square and triangle, and to provide an instrument for doing the same work in making mechanical drawings and architectural and other drawings in less time and less labor than heretofore is therefore the principal object of my invention.

To this end the invention consists, broadly, in the arrangement and combination of a circular board, on which the drawing-paper or other material is to be secured in the usual manner, a movable or rotatable ring or frame connected with said board, and a sliding rule or linead connected with said ring or frame.

The invention consists, further, in the arrangement and combination, with this circular board provided with graduations at or near its outer periphery, representing degrees, of a sliding ring or frame to be used in connection with said board, and a sliding rule or linead connected with said ring or frame.

The invention consists, still further, in certain other arrangements and combinations of parts, such as will be more fully brought out in the accompanying specification, and finally embodied in the clauses of the claim.

The invention is illustrated in the accompanying drawings, in which—

Figure 1 is a plan view of my drawing-board attachment, clearly illustrating the novel features and the principles of my invention, and Fig. 2 is a vertical cross-section of the same. Fig. 3 is a detail section, on an enlarged scale, of a portion of the device, illustrating more clearly the operative relation of the circular board, sliding ring or frame, and linead, and a means for securing the device upon a bottom board or table, if desired. Fig. 4 is a perspective view of a rule or linead used in connection with the device. Figs. 5 and 6 are detail sectional views of parts of the circular board and sliding ring or frame, illustrating in plan and side view, respectively, a modified form of means for holding or locking said sliding ring or frame in its adjusted position. Fig. 7 is a plan view of a drawing-board attachment of a slightly different construction, but still embodying the features of my invention. Fig. 8 is a plan view of a drawing-board attachment of still another modified form of construction. Fig. 9 is a vertical section of the same, taken on line $x$ in Fig. 8; and Fig. 10 is a detail section of a spring-actuated locking device for holding the sliding ring or frame in its adjusted position.

Similar letters of reference are employed to indicate corresponding parts in all of the said views.

In said drawings, $b$ represents an ordinary base-board or table on which is placed my novel form of drawing-board attachment. The latter consists of a circular drawing-board $a$, of any suitable size, and upon which is arranged or secured, in the usual manner, a sheet of drawing-paper or other material, as clearly illustrated in Fig. 1. Said drawing-board $a$ may be simply placed upon the board or table $b$ without being fastened down, but, if desired, suitable fastening-lugs $c$ may be used, each lug having a perforation $c'$ and being secured by means of screws or pins $c^2$ to the base-board $b$. The opposite end of each lug $c$ is arranged in a recessed part $a'$ in the bottom of the circular board $a$, and is fastened therein by means of a screw $c^3$, as clearly represented in Figs. 2 and 3. Of course it will be evident that other suitable means may be employed for securing the board $a$ in position on the base-board or table $b$.

As clearly shown in the several figures of the drawings, I may secure to the outer peripheral edge of said circular plate or drawing-board $a$ a metallic or other suitable band $a^2$, provided with graduations representing numbers of degrees. Encircling said drawing-board $a$ is a suitable ring or frame $d$, which is preferably made of metal, but may be made of wood, if desired, and has one or more squared sides or straight edges $d'$, on each of which is arranged a comparatively wide bar $d^2$ and a narrower bar $d^3$, secured together in any well-known manner, but preferably by means of a thumb-screw $d^4$, substantially as illustrated in Fig. 3. Said bars $d^2$ and $d^3$ on opposite sides of said ring or frame $d$ form suitable ways or guides for a sliding rule or linead $e$, which is made of wood in the manner of an ordinary T-square. At each end of said linead or rule $e$ I have secured the cross-heads $e'$, which are preferably cut away, as at $e^2$, and fit and are capable of sliding on the portions $d^5$ of the bars $d^2$. If desired, one or both of said bars $d^3$ may be provided with a scale, as illustrated in Fig. 1. As shown more particularly in Fig. 3, the holes $d^6$, in which the bolts or thumb-screws $d^4$ are arranged, are oblong to permit the adjustment of said bars $d^3$ either way when the linead $e$ binds on the guides or when said guides are not parallel. Said ring or frame $d$ is rotatively arranged on the upper surface of the said lugs $c$ and may be held or locked in any adjusted position by means of one or more cams $f$, pivotally arranged on the base-board $b$ in the manner as will be clearly evident from an inspection of Fig. 1.

In lieu of the construction of the several parts illustrated in Figs. 1, 2, and 3 the lugs $c$ may be dispensed with and a metallic or other suitable ring $c^4$ secured to the board $b$. The ring or frame $d$, which encircles the drawing-board $a$, is provided with an annular flange $d^7$ and is held in place by means of washers $g$ on suitable screw-bolts $g'$ in said base-board $b$, said washers being tightened down against said flange $d^7$ or unloosened by thumb-nuts $g^2$, substantially as illustrated in Figs. 5 and 6. Thus it will be seen that when the nuts $g^2$ are untightened then the ring or frame $d$ can be rotated or moved to any desired position, and when the nuts are again tightened down then said ring or frame is held in its adjusted position.

The operation of the device is as follows: To use the linead $e$ for drawing horizontal lines on the paper on the drawing-board $a$, the zero-mark at $d^8$ on the ring or frame $d$ is made to correspond with the zero-mark on the board $a$. The rule or linead can then be made to slide up and down on the guides or ways connected with said ring or frame $d$, and any number of horizontal and parallel lines can be drawn. To draw vertical lines without the use of the triangle, the cam-levers $f$ or other suitable locking means employed are disengaged from their holding contact with the ring or frame $d$ and the latter is rotated or moved to bring its zero-mark at $d^8$ directly opposite the number "90" on the drawing-board $a$. The guides or ways and the rule or linead being fixed on said ring or frame $d$ will of course move with the same, and therefore any number of vertical lines can be drawn with the rule or linead $e$. By bringing the zero-point at $d^8$ opposite any other number on the drawing-board $a$, parallel lines can be drawn at any desired angle, as will be clearly evident from an inspection of Fig. 1.

In Fig. 7 I have shown a construction of drawing-board attachment in which the ring or frame $d$ is provided with but one bar $d^2$ on one side of the same, said bar being perfectly flat on its upper surface. This bar, as indicated in said figure, can be used as a straight-edge for placing an ordinary T-square against the same, and when it is desired to draw lines at any angle all that is necessary is to change the position of the ring or frame $d$, thereby bringing the bar $d^2$ to another position, and the T-square can be used in the usual manner.

In Figs. 8, 9, and 10 I have shown still another modified form of construction of the device, which consists in the arrangement of the circular drawing-board $a$, secured by means of the screws $b'$ to the lower board or open framework $b$. Said drawing-board $a$ is surrounded by the graduated rim or ring $a^2$, hereinabove mentioned. Encircling said board $a$ and its ring $a^2$ is the sliding part $d$, which in this case is made in the manner of a square and open frame, and on two sides of which are secured the bars $d^8$, forming the guides or ways for the rule or linead $e$. One of said bars $d^8$ may be provided with graduations, as clearly shown. The operations of the several parts of this device are similar to those described in connection with the construction shown in Figs. 1 and 2, except that I employ a different locking means for holding or locking the frame $d$ in its adjusted position. In one side of the frame $d$ is a perforation $d^9$, into which extends a pin $h$, having a finger-piece $h'$ and a groove $h^2$, as clearly shown in Fig. 10. Secured to the side of said frame $d$ is a spring $i$, having the forked end $i'$, which extends into said groove $h^2$ and normally forces the end $h^3$ of the pin $h$ into frictional holding contact with the circular edge of the board $a$ or the metallic band $a^2$, surrounding the same, as will be clearly evident.

The utility of the herein-described device will be evident from the above description and an inspection of the drawings, doing away with the use of the triangle. It is also of great benefit to the draftsman in sectionizing drawings and quickly laying out polygonal figures.

I am fully aware that many changes may be made in the details of the arrangements and constructions of the parts. Hence I do not limit myself to the exact combinations of the parts herein shown and described.

Having thus described my invention, what I claim is—

1. An attachment or device for drawing, comprising therein, a circular drawing-board, a movable or rotatable ring or frame encircling said board, and a sliding rule or linead, all operating substantially as and for the purposes set forth.

2. An attachment or device for drawing, comprising therein, a circular drawing-board, a band encircling said board and having graduations, a movable and rotatable ring or frame encircling said board, and a sliding rule or linead, all operating substantially as and for the purposes set forth.

3. An attachment or device for drawing, comprising therein, a circular drawing-board, a movable or rotatable ring or frame encircling said board, and a straight edge on said ring or frame, on which a linead may be used, substantially as and for the purposes set forth.

4. An attachment or device for drawing, comprising therein, a circular drawing-board, a band encircling said board and having graduations, a movable and rotatable ring or frame encircling said board, and a straight edge on said ring or frame, on which a linead may be used, substantially as and for the purposes set forth.

5. An attachment or device for drawing, comprising therein, a circular drawing-board, a movable or rotatable ring or frame encircling said board, guides or ways on said ring or frame, and a rule or linead movable on said guides or ways, substantially as and for the purposes set forth.

6. An attachment or device for drawing, comprising therein, a circular drawing-board, a band encircling said board and having graduations, a movable or rotatable ring or frame encircling said board, guides or ways on said ring or frame, and a rule or linead movable on said guides or ways, substantially as and for the purposes set forth.

7. An attachment or device for drawing, comprising therein, a circular drawing-board, a movable or rotatable ring or frame encircling said board, guides or ways on said ring or frame, and a rule or linead movable on said guides or ways, and means adapted to engage with said ring or frame to hold or lock the same in its moved or rotated position, substantially as and for the purposes set forth.

8. An attachment or device for drawing, comprising therein, a circular drawing-board, a band encircling said board and having graduations, a movable or rotatable ring or frame encircling said board, guides or ways on said ring or frame and a rule or linead movable on said guides or ways, and means adapted to engage with said ring or frame to hold or lock the same in its moved or rotated position, substantially as and for the purposes set forth.

9. An attachment or device for drawing, comprising therein, a circular drawing-board, lugs c secured to said board, a ring or frame encircling said board and movably or rotatively arranged on said lugs, guides or ways on said ring, and a rule or linead movable on said guides or ways, substantially as and for the purposes set forth.

10. An attachment or device for drawing, comprising therein, a circular drawing-board, a band encircling said board and having graduations, lugs c secured to said board, a ring or frame encircling said board and movably or rotatively arranged on said lugs, guides or ways on said ring or frame, and a rule or linead movable on said guides or ways, substantially as and for the purposes set forth.

11. An attachment or device for drawing, comprising therein a circular drawing-board, lugs c secured to said board, a ring or frame encircling said board and movably or rotatively arranged on said lugs, guides or ways on said ring, and a rule or linead movable on said guides or ways, and means adapted to engage with said ring or frame to hold or lock the same in its moved or rotated position, substantially as and for the purposes set forth.

12. An attachment or device for drawing, comprising therein, a circular drawing-board, a band encircling said board and having graduations, lugs c secured to said board, a ring or frame encircling said board and movably or rotatively arranged on said lugs, guides or ways on said ring or frame, a rule or linead movable on said guides or ways, and means adapted to engage with said ring or frame to hold or lock the same in its moved or rotated position, substantially as and for the purposes set forth.

In testimony that I claim the invention set forth above I have hereunto set my hand this 28th day of October, 1895.

JACOB O. POOLE.

Witnesses:
FREDK. C. FRAENTZEL,
E. P. BACKUS.